United States Patent [19]
Yamashita et al.

[11] Patent Number: 5,827,586
[45] Date of Patent: Oct. 27, 1998

[54] PACKAGING MATERIAL COMPRISING A WATER-SOLUBLE FILM

[75] Inventors: Ryo Yamashita, Nishinomiya; Kenichi Kitagaki, Kawanishi; Takahiro Matsubara; Mikio Takenaka, both of Takarazuka, all of Japan

[73] Assignee: Ciba-Geigy Japan Limited, Hyogo, Japan

[21] Appl. No.: 766,323

[22] PCT Filed: Jun. 8, 1994

[86] PCT No.: PCT/IB94/00148

§ 371 Date: Dec. 14, 1995

§ 102(e) Date: Dec. 14, 1995

[87] PCT Pub. No.: WO94/29104

PCT Pub. Date: Dec. 22, 1994

Related U.S. Application Data

[63] Continuation of Ser. No. 571,905, Dec. 14, 1995, abandoned.

[30] Foreign Application Priority Data

Jun. 15, 1993 [JP] Japan ..................................... 5-168441

[51] Int. Cl.⁶ .................................................. B65D 65/46

[52] U.S. Cl. ...................... 428/36.6; 428/34.3; 428/35.3; 428/35.4; 428/35.9; 428/57; 383/1; 383/37; 383/210; 383/107; 383/109; 383/113; 206/524.1; 206/524.2; 206/524.5; 206/524.7

[58] Field of Search ................................. 428/34.3, 35.3, 428/35.4, 35.9, 36.6, 57; 383/1, 37, 200, 210, 107, 109, 113; 206/524.1, 524.2, 524.5, 524.7

[56] References Cited

FOREIGN PATENT DOCUMENTS 1 054 808  4/1967  United Kingdom .

*Primary Examiner*—Charles Nold
*Attorney, Agent, or Firm*—Wenderoth, Lind & Ponack, L.L.P.

[57] ABSTRACT

A packaging container for chemicals such as pesticides and the like and a laminated film for forming said container, wherein the inner layer of the laminated film is constituted of an inner bag made of a water-soluble polymer film and the outer layer of the laminated film is constituted of an outer bag made of a water-insoluble film, and at least in the seal part of the container, films constituting inner layer are bonded to each other and additionally the film constituting inner layer and the film constituting outer layer are bonded to each other, and the film constituting inner layer and the film constituting outer layer are releasable from each other.

12 Claims, 1 Drawing Sheet

PACKAGING MATERIAL COMPRISING A WATER-SOLUBLE FILM

This application is a continuation of now abandoned application Ser. No. 08/571,905, filed Dec. 14, 1995, which application is U.S. national phase application of International Application No. PCT/IB94/00148.

The present invention relates to a container for use in dividingly packaging chemical preparations, particularly pesticide preparations, and to a film for forming said container.

A chemical preparation such as pesticide preparation has so far been made into an article by directly filling a container with the preparation and packaging the container, whether the preparation is a solid or a liquid. Otherwise, an article has been made by packing a preparation in an inner bag made of water-soluble film and further packaging the inner bag thus obtained into a prior type of direct packaging container to form a double package.

If a pesticide having been packed in an inner bag made of water-soluble film is further packaged in an outer packaging container in the form of double package, however, the process of packaging involves two steps, namely the first step for dividingly packing the pesticide into inner bags and the second step for introducing and packaging one or more inner bags into one outer bag, and such a process is not economical from the viewpoint of working efficiency. Further, since the process involves the two packaging steps, two kinds of packaging machines are necessary, namely the first packaging machine for packing a pesticide into inner bags on the one hand and the second packaging machine for sealing the outer bags on the other hand. A packaging work using a water-soluble film has to be carried out in an appropriately air-conditioned environment because the water-soluble film is susceptible to the influence of atmospheric conditions such as humidity, temperature, etc. The insertion of inner bags into the outer bag must be carried out manually because the inner bags are soft in nature and leakage of content from inner bags must be prevented carefully, and such a manual operation makes automation of the inserting work quite difficult.

Further, in a double package, the inner bags are liberated from the protective outer bag and therefore cannot sufficiently be protected from the shocks which may be applied to the inner bags in the course of transportation in spite of the protective function of the outer bag. Thus, as an disadvantage, breakage of inner bags can take place.

The aim of the present invention is to solve the above-mentioned problems in the prior packaging containers for chemical preparations.

One object of the present invention provides a packaging container capable of exhibiting the same function and effect as in the prior double package type of packaging container including water-soluble inner bags, which can be produced by using the same packaging materials as in the prior direct packing type of containers for chemical preparations in only one step of packaging process.

Another object of the present invention consists in providing a packaging bag wherein the dislocation of inner bags in the outer bag is prevented and the outer bag can sufficiently function as a protective bag.

A further object of the invention consists in providing a packaging film for forming the above-described packaging bag.

The packaging container for chemical preparations according to the present invention is a container formed by sealing multi-layer films each constituted of a water-soluble polymer film and at least one layer of water-insoluble film, wherein the inner layer of the container is constituted of a water-soluble polymer film, the outer layer of the container is constituted of a water-insoluble film, and at least in the seal part, water-soluble polymer films of the inner layer are bonded to each other, a water-soluble polymer film of the inner layer and a water-insoluble film of the outer layer are bonded to each other, and the water-soluble polymer films and water-insoluble films are readily releasable from one another.

According to the invention, the multi-layer film for forming a packaging container for chemical preparations may be a product prepared by simply superposing a water-soluble polymer film and a water-insoluble film. A bag-form container is made therefrom by sealing the films so that the water-soluble polymer film constructs the inside layer of the container.

When the water-soluble polymer films constituting an inner layer of container are heat-sealable with each other and the water-soluble polymer film of inner layer and the water-insoluble film of outer layer are heat-sealable with each other, the multi-layer film can be formed into a bag by the method of heat-sealing. However, the heat seal part formed between the water-soluble polymer film of inner layer and the water-insoluble film of outer layer must be readily releasable from each other. Accordingly, combination of the water-soluble polymer film and the water-insoluble film must be so selected that the two films are heat-sealable with each other and the heat seal part is readily releasable. Examples of such combination include partially saponified polyvinyl alcohol film as a water-soluble polymer film combined with completely saponified polyvinyl alcohol film or ethylene-vinyl acetate copolymer film as a water-insoluble film.

When the water-soluble polymer films are not heat-sealable with each other or when, although the water-soluble polymer film and the water-insoluble film are heat-sealable with each other, the heat seal strength is too high to make the two films readily releasable from each other, the multi-layer film may be formed into a bag by bonding it with a readily releasable adhesive.

A packaging container for chemical preparations according to the present invention can also be produced by forming, by means of heat sealing or by the use of a readily releasable adhesive, a laminated film wherein a water-soluble polymer film and a water-insoluble film are partially or wholly bonded together previously by thy method of welding or by the use of a readily releasable adhesive and said water-soluble polymer film and said water-insoluble film are readily releasable from each other. The partial bonding of the water-soluble polymer film and water-insoluble film may be practiced spot-wise, stripe-wise or lattice-wise, or in a shape necessary for formation of intended bag, namely usually quadrilateral-wise.

The water-soluble polymer films used in the invention may be any films, so far as they are soluble in water and have a necessary strength. Examples of the polymer usable for forming a water-soluble polymer film of the invention include water-soluble synthetic polymers, water-soluble semisynthetic polymers and water-soluble natural polymers. As the water-soluble synthetic polymer, mention may be made of partially saponified polyvinyl alcohol, polyethers such as polyethylene oxide and the like, polyvinylpyrrolidone, ethylenically unsaturated acids such as acrylic acid, methacrylic acid, maleic acid and the like, and polymers formed from their salts.

As the water-soluble semisynthetic polymer, mention may be made of cellulose derivatives such as carboxymethyl cellulose, hydroxyethyl cellulose, hydroxypropyl cellulose and the like; and starch derivatives such as cyclodextrin and the like. As the water-soluble natural polymer, mention may be made of carrageena, starch, gelatin, chitin and the like. Among these polymers, partially saponified polyvinyl alcohol is particularly preferable.

As the water-insoluble film, thermoplastic resin films, laminated films prepared from two or more kinds of thermoplastic resin films, and laminated films prepared from a thermoplastic resin film and paper, metallic foil, woven fabric or unwoven fabric can be used. Preferable thermoplastic resins include polymers and copolymers of olefins such as ethylene, propylene, butene, pentene, hexene and the like; polymers and copolymers of vinyl compounds such as vinyl chloride, vinylidene chloride, vinylacetate, vinyl alcohol, acrylic ester, methacrylic ester, acrylonitrile, styrene and the like; polymers of diolefins such as butadiene, isoprene and the like; copolymers of the above-mentioned diolefins and the above mentioned olefins or vinyl compounds; polyamides; and polyesters such as polyethylene terephthalate and the like.

Particularly preferable thermoplastic resin films are completely saponified polyvinyl alcohol film, ethylene-vinyl acetate copolymer film, ethylene-vinyl alcohol copolymer film and the like.

Preferable water-insoluble films include laminated films prepared from multiple members of the above-mentioned thermoplastic resin films such as a laminated film prepared from an ethylene-vinyl acetate copolymer film and a polyethylene film or a nylon film, and thermoplastic resin films having a metallic foil layer or a vapor-deposited metal layer such as ethylene-vinyl acetate copolymer film having a vapor deposited aluminum layer or polyethylene terephthalate film having a vapor deposited aluminum layer. Laminated films formed from one of the above-mentioned thermoplastic resin films and paper, woven fabric or unwoven fabric are also usable in the invention.

As the readily releasable adhesive, a variety of products are commercially available, and these adhesives may be used appropriately. Apart from the commercial products, an adhesive prepared by blending ethylene-vinyl acetate copolymer or polystyrene as a base with styrene-butadiene block copolymer or the like, a hot melt adhesive prepared by blending ethylene-vinyl acetate copolymer and a wax as main ingredients with a caking material such as styrene polymer (for example, polyvinyltoluene), terpene polymer, rosin or the like, etc. can be used.

The chemical preparations to be packaged into the container of the present invention include those for agricultural and horticultural uses, those for livestock raising uses and those for domestic uses such as insecticide, bactericide, fungicide, herbicide, rodenticide, plant growth regulator, repellent, attractant, spreader and the like, as well as fertilizers, detergents, dyes, and other general chemical preparations.

BRIEF DESCRIPTION OF THE DRAWINGS

In the following figures:

1 is packaging container for chemical preparations,
2 is water-insoluble film,
3 is water-soluble polymer film,
4 is seal layer,
5 is multi-layer film,
6 is former,
7 is filling machine,
8 is longitudinal heat sealer,
9 is lateral heat seale, and
10 is heat seal part.

FIG. 1 shows a container 1 of two superposed sheets of multi-layer films, each constituted of a water-soluble film 3 and a water-insoluble film 2, so that the water-soluble film layer 3 is inside, the films showing a heat-sealing of three sides of the superposed matter while leaving one side open (which may be sealed after filling).

Figure 1:
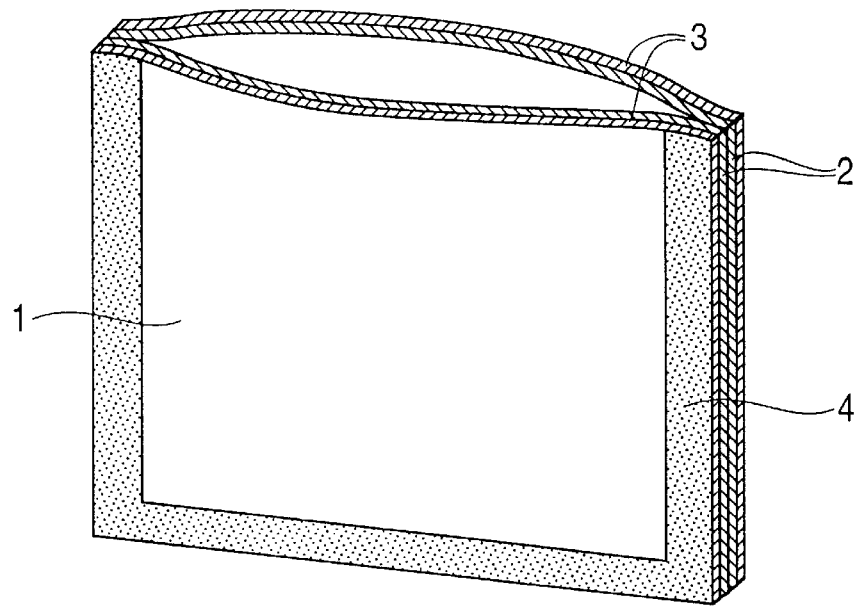
FIG. 1 is a perspective view illustrating one embodiment of the packaging container for chemical preparations of the present invention.

A container similar to that of FIG. 1 may be produced by folding one sheet of the multi-layer film so that the water-soluble film comes inside, followed by sealing two sides of the folded multi-layer film while leaving the residual one side open. After introducing a chemical preparation from the open side, the open side is sealed.

Figure 2:
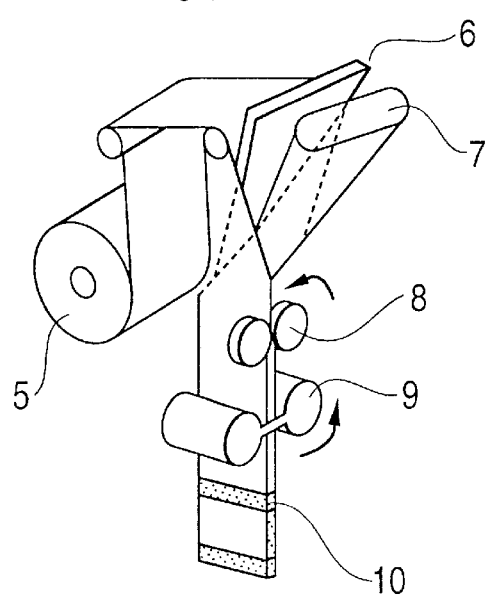

FIG. 2 is a schematic view illustrating one embodiment of the work for introducing and packaging a chemical preparation into the packaging container of the present invention. FIG. 2 illustrates an example of a device for packaging a chemical preparation while forming a container. Thus, while unrolling a rolled multi-layer film 5 along the former 6 and folding it so that the water-soluble film layer comes inside, a prescribed quantity of chemical preparation is introduced into the folded matter by means of a filling machine 7, and thereafter the longitudinal side of the folded film is heat-sealed with heat sealer 8, and finally a lateral line of the folded film is heat-sealed with a lateral heat-sealer 9. The mark 10 denotes a heat seal part.

In putting a chemical preparation packaged in the container of the invention to practical use, the water-insoluble film constituting the outer layer is peeled off, and the preparation packaged dividingly in the water-soluble film units are thrown into water together with the water-soluble film and then put to use.

Another object of the invention is the use of the container according to the invention for package of hazardous chemicals, especially pesticides. The container is especially suitable for this use, since a person is neither contacted during filling nor preparation of a spraying composition; and the environment contamination is avoided, since no contaminated residues remain.

The following examples explain the invention in more detail. PVA means polyvinyl alcohol. PET means polyethylene terephthalate.

EXAMPLE 1

A three sides-sealed laminate bag is prepared by using Solbron KC-35 (partially saponified PVA resin film, manufactured by AICELO Co.) as a water-soluble film and Hicelon NP-40 (completely saponified PVA resin manufactured by AICELO Co.) as an outer protective water-insoluble film by the method of heat sealing without intermediation of adhesive. The bag thus obtained was left to stand in a thermostatted chamber kept at 40° C. for one month to test its storage stability. As the result, both adhesive property and releasability are good between the water-soluble film and the outer protective film.

EXAMPLE 2

A four sides-sealed laminate bag is prepared by using Solbron KC-35 (partially saponified PVA resin film, manufactured by AICELO Co.) as a water-soluble film and Eval HS (ethylene-vinyl alcohol copolymer resin, manufactured by KURARAY Co.) as an outer protective water-insoluble film by the method of heat sealing without intermediation of adhesive. The bag thus obtained was left to stand in a thermostatted chamber kept at 40° C. for one month to test storage stability. As the result, both adhesive property and releasability are good between the water-soluble film and the outer protective film.

EXAMPLE 3

A four sides-sealed laminate bag is prepared by using Solbron KC-35 (partially saponified PVA resin film, manufactured by AICELO Co.) as a water-soluble film and Eval HS/NY (laminate formed from ethylene-vinyl alcohol copolymer resin film and nylon film, manufactured by KURARAY Co.) as an outer protective water-insoluble film by the method of heat sealing without intermediation of adhesive. The bag thus obtained is left to stand in a thermostatted chamber kept at 40° C. for one month to test storage stability. As the result, both adhesive property and releasability are good between the water-soluble film and the outer protective film.

EXAMPLE 4

A four sides-sealed laminate bag is prepared by using Solbron KC-35 (partially saponified PVA resin film, manufactured by AICELO Co.) as a water-soluble film and Eval VMXL (ethylene-vinyl alcohol copolymer resin film with a vapor-deposited aluminum layer, manufactured by KURARAY Co.) as an outer protective water-insoluble film by the method of heat sealing without intermediation of adhesive. The bag thus obtained is left to stand in a thermostatted chamber kept at 40° C. for one month to test storage stability. As the result, both adhesive property and releasability are good between the water-soluble film and the outer protective film.

EXAMPLE 5

A four sides-sealed laminate bag is prepared by using Solbron KA-50(partially saponified PVA resin film, manufactured by AICELO Co.) as a water-soluble film and a polyethylene terephthalate laminate (aluminum vapor deposited PET/dry laminate/PET) as an outer protective water-insoluble film through intermediation of a releasable adhesive. The bag thus obtained is left to stand in a thermostatted chamber kept at 40° C. for one month to test storage stability. As the result, both adhesive property and releasability are good between the water-soluble film and the outer protective film.

EXAMPLE 6

A four sides-sealed laminate bag is prepared by using Soafil PSF 100 (natural carrageena film, manufactured by Mitsubishi Rayon Co.) as a water-soluble film and Hicelon NP-40 (completely saponified PVA resin, manufactured by AICELO Co.) as an outer protective water-insoluble film by the method of heat sealing without intermediation of adhesive. The bag thus obtained is left to stand in a thermostatted chamber kept at 40° C. for one month to test storage stability. As the result, both adhesive property and releasability are good between the water-soluble film and the outer protective film.

EXAMPLE 7

A four sides-sealed laminate bag is prepared by using Soafil PSF 100 (natural carrageena film, manufactured by Mitsubishi Rayon Co.) as a water-soluble film and Eval HS (ethylene-vinyl alcohol copolymer resin film, manufactured by KURARAY Co.) as an outer protective water-insoluble film by the method of heat sealing without intermediation of adhesive. The bag thus obtained is left to stand in a thermostatted chamber kept at 40° C. for one month to test storage stability. As the result, both adhesive property and releasability are good between the water-soluble film and the outer protective film.

According to the prior technique of double packaging, a water-soluble film is used as an inner bag and one or more inner bags are introduced and packaged in an outer bag, and such a process has necessitated two steps of procedure, namely a step for introducing a chemical preparation into inner bags and a step for inserting the inner bags containing the chemical preparation into an outer bag. In the packaging container for chemical preparations according to the present invention, contrariwise, the work for packaging a chemical preparation into container is simplified to only one step.

In the prior double package, the inner bags are liberated from the outer bag, so that the inner bags can be broken by the shock which may be applied at the time of transportation, which means that the outer bag, cannot function as a protective bag sufficiently. In the packaging container of the present invention, contrariwise, the inner bag made of a water-soluble film is bonded to the water-insoluble outer bag at least in the seal part, so that the inner bag is protected against dislocation at the time of transportation and therefore against the breakage brought about by shocks.

Further, since the water-soluble inner bag and the water-insoluble outer bag are readily releasable from each other, the outer protective bag can easily be removed at the time of putting the preparation to use. Since the chemical preparation dividingly packaged in the water-soluble film can be used without taking it out of the water-soluble bag, the flying loss of chemical preparation can be prevented. Further, since the chemical preparation is brought into no direct contact with the skin, a safety of the worker can be assured.

Further, since no chemical preparation adheres to the protective bag released from inner bags, the outer bag can be disposed with safety as a general waste.

What is claimed is:

1. A packaging container formed by sealing multi-layer films each constituted of a water-soluble polymer film and at least one layer of water-insoluble film, wherein the inner layer of said container is constituted of a water-soluble polymer film and the outer layer of said container is constituted of water-insoluble films, the water-soluble polymer film and the water-insoluble film are readily releasable from each other, and the water-soluble film envelopes a hazardous chemical, and wherein the films are superposed and bonded to each other only in the peripheral seal part of the container.

2. A packaging container according to claim 1, wherein in the seal part of the container, water-soluble polymer films constituting the inner layer are bonded to each other by means of heat-sealing, and water-insoluble films constituting the outer layer are bonded thereon by means of an adhesive.

3. A packaging container for chemical preparations according to claim 1, wherein in the seal part of the container water-soluble polymer films constituting the inner layer are bonded to each other and a water-soluble polymer film constituting the inner layer and a water-insoluble film constituting the outer layer are bonded to each other both by means of heat sealing.

4. A packaging container according to claim 1, wherein in the seal part of the container water-soluble polymer films constituting the inner layer are bonded to each other and a water-soluble polymer film constituting the inner layer and a water-insoluble film constituting the outer layer are bonded to each other both by means of an adhesive.

5. A packaging container for chemical preparations according to claim 1, wherein said water-insoluble polymer film is selected from the group consisting of water-soluble synthetic polymer film, water-soluble semisynthetic polymer film and water-soluble natural polymer film.

6. A packaging container for chemical preparations according to claim 1, wherein said water-soluble film is selected from the group consisting of thermoplastic resin film, laminated film prepared from two or more kinds of thermoplastic resin films and laminated film prepared from a thermoplastic resin film and paper, metallic foil, woven fabric or unwoven fabric.

7. A packaging container for chemical preparations according to claim 1, wherein said water-soluble polymer film constituting the inner layer is a partially saponified polyvinyl alcohol film, the water-insoluble film constituting the outer layer is a completely saponified polyvinyl alcohol film.

8. A packaging container for chemical preparations according to claim 7, wherein the completely saponified polyvinyl alcohol copolymer film is laminated with other thermoplastic resin film or metallic film.

9. A packaging container for chemical preparations according to claim 1, wherein the water-soluble polymer film constituting the inner layer is a partially saponified polyvinyl alcohol film and the water-insoluble film constituting the outer layer is an ethylene-vinyl acetate copolymer film.

10. A packaging container for chemical preparations according to claim 9, wherein said ethylene-vinyl acetate copolymer film is laminated with other thermoplastic resin film or metallic film.

11. A container according to claim 1, wherein the hazardous chemical is a pesticide.

12. A method for the preparation of an aqueous pesticide formulation, which comprises peeling off the outer layer of the packaging container according to claim 1 and placing the inner water-soluble layer containing the pesticide into water.

* * * * *